(12) United States Patent
Schmidt et al.

(10) Patent No.: US 6,852,445 B1
(45) Date of Patent: Feb. 8, 2005

(54) BATTERY SHEATH MADE OF A FORMED COLD-ROLLED SHEET AND METHOD FOR PRODUCING BATTERY SHEATHS

(75) Inventors: Ferdinand Schmidt, Duesseldorf (DE);
Anette Schenck, Duesseldorf (DE);
Beate Monscheuer, Monheim (DE);
Helmut Kossler, Schwalmtal (DE);
Nikolaus Ferenczy, Haan (DE);
Annette Borisch, Wuppertal (DE);
Werner Olberding, Velbert (DE)

(73) Assignee: Hille & Mueller GmbH, Duesseldorf (DE)

( * ) Notice: Subject to any disclaimer, the term of this patent is extended or adjusted under 35 U.S.C. 154(b) by 0 days.

(21) Appl. No.: 09/831,583

(22) PCT Filed: Oct. 20, 1999

(86) PCT No.: PCT/EP99/07961

§ 371 (c)(1),
(2), (4) Date: Jun. 21, 2001

(87) PCT Pub. No.: WO00/30188

PCT Pub. Date: May 25, 2000

(30) Foreign Application Priority Data

Nov. 12, 1998 (DE) .......................... 198 52 202

(51) Int. Cl.$^7$ ................................ H01M 2/02
(52) U.S. Cl. ............ 429/163; 29/623.1; 29/623.5; 29/2; 429/176; 429/233; 205/57; 205/60; 205/334
(58) Field of Search .................. 205/57, 60, 334; 29/623.1, 623.5; 429/163, 176, 233

(56) References Cited

U.S. PATENT DOCUMENTS 5,993,994 A * 11/1999 Ohmura .................. 429/176
6,087,040 A * 7/2000 Ohmura .................. 429/176
6,136,107 A * 10/2000 Ohmura .................. 148/537
6,261,718 B1 * 7/2001 Ohmura .................. 429/176
6,485,863 B2 * 11/2002 Ohmura .................. 429/176

FOREIGN PATENT DOCUMENTS

| EP | 0 725 453 A1 | | 4/1995 | |
| EP | 1 103 638 A1 | | 5/2001 | |
| JP | 62 274568 A | | 11/1987 | |
| JP | 08 017406 A | | 1/1996 | |
| JP | 10-012199 | * | 1/1998 | ............ H01M/2/02 |
| JP | 10-083801 | * | 3/1998 | ............ H01M/2/02 |
| WO | WO 95/11527 | * | 4/1995 | ............ H01M/2/02 |
| WO | WO 01/27355 | * | 4/2001 | ............ C25D/3/56 |

OTHER PUBLICATIONS

Unknown, "Huette Taschenbuch fuer Eisenhuetteleute," 5th ed., Wilhelm Ernst & Sohn (Berlin, Germany), pp. 98–99, (Apr. 26, 1961).

* cited by examiner

Primary Examiner—Mark Ruthkosky
(74) Attorney, Agent, or Firm—Hahn Loeser + Parks LLP

(57) ABSTRACT

A battery sheath made of formed and cold-rolled sheet metal as well as a process for manufacturing the battery sheath are proposed. In the process, cold-rolled strip stock is provided on at least one side with a coating of Ni, Co, Fe, Sn, In, Pd, Bi or their alloys in an electroplating bath, e.g., a Watts-type bath. As an additional component, the electroplating bath contains electrically conductive particles such as carbon, carbon black, graphite, $TiS_2$, $TaS_2$, $MoSi_2$. These particles are deposited on the base material during electroplating together with Ni, Co, Fe, Sn, In, Pd, Bi or their alloys. The sheet metal side with, for example, the carbon-containing electroplated coating faces preferably inwardly when the sheet is formed into a battery sheath. Batteries with battery sheaths produced in this manner exhibit reduced increase in internal resistance, even with prolonged storage, as compared to known batteries.

20 Claims, No Drawings

BATTERY SHEATH MADE OF A FORMED COLD-ROLLED SHEET AND METHOD FOR PRODUCING BATTERY SHEATHS

The invention relates first to a battery sheath made of formed cold-rolled sheet metal, which is provided at least on its inside with a coating produced by electroplating containing Ni, Co, Fe, Sn, In, Pd. Bi and/or their alloys.

The invention relates furthermore to a process for manufacturing strip stock for battery sheaths wherein cold-rolled sheet metal is provided with a coating in an electroplating bath.

The quality of batteries is determined among other things by how long the guaranteed nominal voltage and capacity can be retained. The higher the battery's internal resistance, the lower the voltage of the battery in its charged state. A further important characteristic for the quality of a battery is its behavior during prolonged storage. Long storage causes the internal resistance of the battery to increase. The internal resistance as well as its increase during prolonged storage depend on several factors: during manufacture of the battery, there is frequently inadequate contact between the electrode made, for example, of nickel-plated steel sheet and the battery filling made of EMD manganese dioxide, graphite, and potassium hydroxide electrolyte. It is furthermore decisive for the increase in the internal resistance of the battery that during storage an oxide/hydroxide layer forms on the nickel surface, which acts like a separation layer and prevents intimate contact with the filling. This phenomenon can occur even with newly manufactured batteries if the battery sheaths provided with a nickel coating on the inside are oxidized.

Battery manufacturers have already taken a number of measures to obviate these disadvantages. It is known, for example, to notch the battery sheath axially in order to apply increased radial pressure along the notch during filling of the battery and thus to improve contact with the battery sheath. This does not, however, uniformly reduce the resistance. It is furthermore known to apply graphite powder to the inside of the battery sheath to reduce the internal resistance of the battery after filling. Such a method is complex and thus expensive.

WO 98/18170 discloses a process for coating the electrodes during the production of electrodes for batteries by covering them with a varnish. The varnish contains an electrode-active material, binder, solvent, and acid. After one side of the electrode has been coated, the layer thus produced is first dried before the other side of the electrode is correspondingly coated.

The Japanese publication JP-A H 9-171802 discloses the manufacture of a battery sheath, in which the inside is provided with an organic coating and carbonization occurs through subsequent heating of the coated surface. The coated surface can furthermore have additional layers of metallic chromium or chromium hydroxide.

The object of the invention is to create a battery sheath for manufacturing batteries that are distinguished by a reduced increase in the internal resistance during prolonged storage as compared to known batteries. Furthermore, a process for producing strip stock for manufacturing such battery sheaths is to be developed.

For a battery sheath of the initially described type, it is proposed for this purpose to embed electrically conductive particles in dispersed form in the electroplated coating to reduce the internal resistance of the future battery, for example, elemental carbon as fine carbon, graphite, or carbon black or, for example, titanium disulfide, tantalum disulfide or molybdenum silicide or mixtures thereof.

When carbon is used, the carbon content of the electroplated coating is 0.7% to 15%. The thickness of the electroplated coating is preferably 0.2 $\mu$m to 8 $\mu$m on one or on both sides of the strip stock, which is to be processed into battery sheaths.

With respect to the process suitable for manufacturing strip stock for such a battery sheath it is proposed that the 0.1 to 1 mm thick cold rolled sheet metal used as the base material be provided on at least one side with a coating of Ni, Co, Fe, Sn, In, Pd, Bi and/or their alloys in an electroplating bath. As an additional component, the electroplating bath contains electrically conductive particles such as, for example, elemental carbon as fine carbon, graphite or carbon black or, for example, titanium disulfide, tantalum disulfide or molybdenum silicide, whereby this/these component(s) is/are deposited on the base material together with Ni, Co, Fe, Sn, Inc, Pd, Bi or their alloys during electroplating.

Preferably, the sheet metal side with the electroplating layer provided with the electrically conductive components faces inwardly when the sheet metal is formed into a battery sheath.

Batteries with battery sheaths manufactured by means of such a process are distinguished by a reduced increase in the internal resistance during prolonged storage as compared to known batteries. Furthermore, the initial internal resistance itself of batteries whose battery sheaths are manufactured according to the inventive process can be significantly lower than that of conventional battery sheaths, which are, for example, simply made of nickel plated steel strip.

Said advantages with respect to the internal resistance of the battery are achieved, in particular, with coatings that combine the elements nickel, cobalt, and graphite. However, layers deposited using iron, tin, indium, palladium and bismuth, or alloys of said elements, have also proven to be suitable for battery sheath coatings.

When using carbon suspended in the electroplating bath, finely distributed electrically conductive particles of elemental carbon (graphite or carbon black) come primarily into consideration. The particle size preferably ranges from 0.5 to 15 $\mu$m.

To achieve the intended embedding of the carbon in dispersed form within the electroplated coating, one embodiment of the process proposes that a uniform flow be produced in the electroplating bath during the plating process. To achieve this uniform flow, the electroplating bath is preferably uniformly circulated. A forced velocity of flow of the electrolyte of 6 to 10 m/s has proven to be particularly suitable.

A further embodiment of the invention proposes that the electroplating bath contain suspension stabilizing and/or coagulation reducing substances in order to achieve a uniform distribution of the electrically conductive particles without local or time-related concentrations.

It may also be advantageous to provide the electroplating bath with stabilizing and/or coagulation reducing substances that result in hard brittle coatings, as is the case, for example, with so-called brighteners. Furthermore, the added substances can also act as brightening or pore reducing agents.

In one embodiment of the process, electroplating deposition occurs in several stages, wherein the electroplating bath contains elemental carbon in at least one of these stages. The material is preferably annealed between electroplating treatment stages. A final heat treatment, i.e. at the end of single or multi-stage deposition, may also be provided. Thermal annealing takes place in a protective gas atmosphere at a temperature ranging from 550° C. to 920° C. as a function of the steel quality used. Thermal annealing causes the substrate to recrystallize and the deposited nickel/cobalt/iron/tin/indium/palladium/bismuth to diffuse into the base material. In addition to the actual recrystallization of the substrate to permit subsequent forming, this also results in good adhesion of the processing layer to the base material during forming and, furthermore, good corrosion protection properties of the product.

In multi-stage deposition, wherein the electrolytic bath contains carbon in at least one of these stages, the stages can be arranged in immediate succession so that different partial coatings are successively deposited in an on-line operation. However, heat treatment by annealing of the material may also be introduced between electroplating stages to achieve partial diffusion of the deposited metal layer into the base material. It is furthermore possible to work in three or more stages, whereby-a plating stage with carbon particles is executed between two or more platings with graphite-free electrolytes. In this case, too, heat treatment by annealing may be provided between the individual plating stages.

The base material for manufacturing the battery sheaths is cold-rolled strip, which in electro-nickel-plated form is widely used for manufacturing battery sheaths. According to the invention, the electroplating bath comprises not only Ni, Co, Fe, Sn, In, Pd and/or Bi but also conductive particles of fine carbon, graphite, carbon black, $TaS_2$ (tantalum disulfide), $TiS_2$ (titanium disulfide) or $MoSi_2$ (molybdenum silicide) finely distributed in the form of a suspension. During electrolytic treatment of the cold-rolled sheet metal, following prior degreasing, rinsing, pickling, rinsing, etc., a joint deposition of both the aforementioned elements and the conductive particles is formed on the surface. There are two different methods to achieve uniform application to the coated surfaces and to keep the state and the composition of the electrolyte constant:

In the first method, for example, finely distributed carbon particles or graphite or carbon black with a particle size ranging from 0.5 to 15 μm are suspended in the electrolyte, e.g., a Watts-type nickel electrolyte, and are kept in suspension by strong agitation of the electrolyte bath. To achieve this motion, a mixer may be used or a forced flow produced in some other manner. The second method also uses mechanical agitation of the electroplating bath. In addition, however, additives to keep the suspension uniform and prevent flocculation and coagulation of the particles are added to the electroplating bath.

It is advantageous to deposit the metal layer that contains the electrically conductive particles and, in particular, the carbon on only one side of the steel sheet, namely on the side that will subsequently form the Inside of the finished battery sheath. This results in an efficient manufacturing process and furthermore makes it possible to retain the usual surface for the outside of the battery sheath. However, it may be advantageous for special applications if a carbon-containing metal layer is also present on the outside of the battery sheath. In this context, reduced contact resistance of the battery sheath or improved tribological properties may, for example, be the goal. Forming of the battery sheath is carried out by one of the processes known per se using multi-stage forming by ironing or deep drawing the sheet thus processed according to the invention.

Cold-rolled steel strip can be treated, for example, in a specially designed plant for strip processing as follows:

electrolytic degreasing with high current density of 30–50 $A/dm^2$
rinsing
pickling in 3–5% sulfuric acid
rinsing
nickel plating in a Watts-type nickel bath having the following composition:
nickel 50–80 g/l as nickel sulfate
chloride 10–30 g/l as nickel chloride
boric acid 35–45 g/l
carbon 20–80 g/l, particle size 0.5–15 μm
pH value 2.1–3.5
temperature 55–80° C.
current density 5–20 $A/dm^2$
agitation primarily laminar, partly turbulent
electrolyte flow 6–10 m/s A further variant of processing by electroplating consists in adding suspension stabilizing and coagulation preventing substances to the bath. These can be, for example, condensation products of formaldehyde and naphtalenesulfonic acid, furthermore ethylene glycol and ethylene alcohol. In this case, the turbulent agitation may be somewhat reduced, whereby an electrolyte flow of 2–8 m/s has proven to be suitable.

The nickel layers produced as specified above measure 0.2–8 μm. The graphite (C) content in the nickel layer is 0.7–15%.

It has furthermore been found that instead of nickel in the C dispersion layer, cobalt, iron, tin, indium, palladium, bismuth and/or their alloys can be advantageously used, whereby the composition of the cobalt bath including graphite corresponds to the aforementioned nickel bath.

EXAMPLE 1

Strip stock of 0.2–0.45 mm thick steel is nickel plated in a nickel bath after degreasing, rinsing, pickling, rinsing, as follows:

Nickel bath composition:
Nickel 60 g/l as nickel sulfate
Chloride 30 g/l as nickel chloride
Boric acid 40 g/l
Graphite 40 g/l, grain size 1–8 μm
pH value 2.3
Temperature 60° C.
Current density 15 $A/dm^2$
Agitation turbulent
Electrolyte flow 6–10 m/s The coating thus produced contains approximately 1.7% graphite.

EXAMPLE 2

The composition of the nickel bath corresponds to that given in Example 1. However, suspension stabilizing agents and coagulation preventing substance are added. Agitation is more moderate; electrolyte flow is only approximately 4 m/s. The graphite content of the deposited nickel layer is 9.0%.

The layer structure produced according to Examples 1 and 2 can have the following composition:

The total layer thickness of 0.2–2 μm is produced with graphite inclusions. According to a variant, a nickel layer of 1.0–1.5 μm without graphite inclusions may be produced to first. After annealing and skin-passing an additional layer of approximately 0.3–0.5 μm with graphite inclusions is deposited.

EXAMPLE 3

Manufacture of Nickel-Cobalt with Graphite Inclusions

For producing nickel cobalt coatings with graphite inclusions, thickness and composition of the strip stock used are identical to Example 1. Pretreatment is also identical. First, pure nickel is deposited from the electrolyte as described in Example 1, without graphite inclusions. After annealing and skin-passing the second layer is produced in a cobalt electrolyte with graphite inclusion. A pure cobalt coating with graphite inclusions is also possible.

EXAMPLE 4
Manufacture of Nickel-iron Alloys with Carbon Inclusions (Graphite, Carbon Black)

After the known pretreatment (see Example 1), the strip surface is coated with an electrolyte of the following composition:

Nickel 47 g/l as nickel sulfate
Chloride 15 g/l as nickel chloride
Iron 1–4 g/l as iron(II) sulfate
Boric acid 45 g/l
Graphite 40 g/l, grain size 1–8 μm
pH value 2.3
Temperature 60° C.
Current density 2–12 A/dm$^2$
Fe content in precipitate 4–55% depending on Fe concentration and current density EXAMPLE 5
Manufacture of Nickel-Tin Alloys with Carbon Inclusions (Graphite, Carbon Black)

Tin 25 g/l as tin chloride
Nickel 60 g/l as nickel chloride
Fluoride 30 g/l as ammonium bifluoride
Graphite 30 g/l, grain size 1–8 μm
pH value 4.5
Temperature 60° C.
Current density 1–4 A/dm$^2$
Sn content in precipitate 30–40% depending on current density and temperature

What is claimed is:

1. A battery sheath made of formed cold-rolled sheet metal, which is provided at least on an inside surface thereof with an electroplated coating selected from a group of metals consisting of Ni, Co, Fe, Sn, In, Pd, Bi and alloys thereof, wherein electrically conductive particles comprising at least one material not selected from the group of metals are embedded in dispersed form in the electroplated coating.

2. The battery sheath according to claim 1 wherein the electroplated coating has a thickness of at least 0.2 μm.

3. The battery sheath according to claim 2 wherein the electroplated coating has a thickness of no more than 8 μm.

4. The battery sheath of claim 1 wherein the electrically conductive particles are selected from a group consisting of: titanium disulfide, tantalum disulfide, molybdenum silicide, elemental carbon in the form of fine carbon, graphite or carbon black, and combinations thereof.

5. The battery sheath according to claim 4 wherein the electroplated coating contains at least 0.7% elemental carbon.

6. The battery sheath according to claim 2 wherein the electroplated coating contains no more than 15% elemental carbon.

7. A process for manufacturing strip stock for battery sheaths in which 0.1 to 1 mm thick cold-rolled sheet metal is provided on at least one side with a coating selected from a group consisting of Ni, Co, Fe, Sn, In, Pd, Bi and alloys thereof, in an electroplating bath, whereby the electroplating bath comprises as an additional component electrically conductive particles comprising at least one material not selected from the group of metals such that the particles are deposited on the sheet metal during electroplating together with the coating.

8. The process according to claim 7 wherein a steady flow is created in the plating electrolyte tank during the plating process.

9. The process according to claim 8 characterized in that the steady flow is produced by mechanical agitation, circulation, or flooding.

10. The process according to claim 8 characterized by a forced flow velocity of the electrolyte of 6 to 10 m/S.

11. The process according to claim 8 characterized in that the electroplating bath contains suspension stabilizing and/or coagulation reducing substances.

12. The process of claim 7 wherein the plating electrolyte contains substances that produce hard, brittle layers (the so-called brighteners).

13. The process of claim 7 wherein the plating electrolyte contains brighteners or pore-scaling substances.

14. The process of claim 7 wherein the electrically conductive particles are selected from a group consisting of: titanium disulfide, tantalum disulfide, molybdenum silicide, elemental carbon in the form of fine carbon, graphite or carbon black, and combinations thereof.

15. The process according to claim 14 wherein the sheet metal is coated with the electroplating coating provided with the electrically conductive particles on the side that faces inwardly when the sheet metal is formed into a battery sheath.

16. The process according to claim 14 wherein the carbon is suspended in the electroplating bath as finely distributed carbon, graphite, or carbon black particles.

17. The process according to claim 16 characterized by a particle size of the carbon, graphite, or carbon black particles of 0.5 μm to 15 μm.

18. The process of claim 14 wherein the electrolytic deposition occurs in several stages, and the electrolyte contains elemental carbon in at least one said stage.

19. The process of claim 18 wherein the material is heat-treated or annealed between electroplating treatment stages.

20. The process of claim 18 wherein the material is heat-treated, particularly annealed, at the end of the electroplating treatment stages.

* * * * *